United States Patent [19]

Iannello et al.

[11] Patent Number: 5,342,825
[45] Date of Patent: Aug. 30, 1994

[54] PASSIVE SUPERCONDUCTING BEARING SYSTEM

[75] Inventors: Victor Iannello, Roanoke, Va.; Michael H. Hall, Piermont, N.H.; Sukhvinder S. Kang, Rochester, Minn.

[73] Assignee: The United States of America as represented by the Secretary of the Air Force, Washington, D.C.

[21] Appl. No.: 93,128

[22] Filed: Jul. 16, 1993

[51] Int. Cl.⁵ ............................................. H01B 12/00
[52] U.S. Cl. ...................................... 505/166; 310/90.5; 310/52; 384/121
[58] Field of Search ................... 310/90.5, 10, 52; 384/121, 123; 505/1, 785

[56] References Cited

U.S. PATENT DOCUMENTS

| | | | |
|---|---|---|---|
| 4,076,340 | 2/1978 | Meinke | 310/90.5 |
| 4,820,950 | 4/1989 | Hijiya | 310/90.5 |
| 4,886,778 | 12/1989 | Moon et al. | 505/1 |
| 4,939,120 | 7/1990 | Moon et al. | 505/1 |
| 4,956,571 | 9/1990 | Gordon | 310/90.5 |
| 5,017,819 | 5/1991 | Patt | 310/90.5 |
| 5,028,585 | 7/1991 | Spencer | 505/785 |
| 5,117,139 | 5/1992 | Flom et al. | 310/90.5 |
| 5,126,611 | 6/1992 | Armstrong | 310/90.5 |
| 5,159,219 | 10/1992 | Chu et al. | 310/90.5 |

*Primary Examiner*—R. Skudy
*Attorney, Agent, or Firm*—William G. Auton

[57] ABSTRACT

A passive superconductor bearing system and process for supporting a rotating member uses permanent magnets in the bore of the rotating member, stationary permanent magnets which encircle the shaft, superconducting materials at the shaft ends, and a duct and pinhole outlet which directs a flow of gas towards one shaft end. The stationary permanent magnets interact with the permanent magnets in the shaft to radially position the shaft in the center of the stationary permanent magnets due to radial repulsive forces between poles of the same polarity. In order to enhance stability, a gas jet is directed towards one end of the shaft to counteract the unbalancing axial force on the shaft caused by permanent magnet interaction. The superconductor-magnet interaction generates a restoring force as the shaft is transversely displaced in any direction away from its equilibrium position. The interaction does not assist shaft rotation, but adds to the stiffness and damping of the bearing system.

8 Claims, 1 Drawing Sheet

PASSIVE SUPERCONDUCTING BEARING SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to superconducting rotating assemblies, and more specifically the invention pertains to a passive superconducting bearing system and process.

The recent discovery of high temperature superconductors (HTSCs) has brought renewed interest in levitation forces produced when magnetic fields are applied to superconductors. When a magnet approaches a superconductor, the superconductor develops a magnetization which tends to repel the magnet. This effect is frequently demonstrated by researchers when a small magnet is levitated above a sample of a high temperature superconductor that is cooled in a dish of liquid nitrogen.

Earnshaw (1842) theoretically showed that a body cannot be stably supported using only permanent magnets—at least one axis must be constrained either non-magnetically or by an active magnetic system that includes closed-loop feedback. This fundamental limitation does not apply to superconductors and other materials which exhibit diamagnetism, i.e., are repelled by a permanent magnet. When a superconductor is cooled below its transition temperature $T_c$, it will exhibit diamagnetism. As a result, superconducting materials may be incorporated into bearings that require no active feedback elements to achieve stability. The task for providing a passive bearing system for superconductive rotating assemblies is alleviated to some extent, by the systems disclosed in the following U.S. Patents, the disclosures of which are incorporated herein by reference:

U.S. Pat. No. 5,159,219 issued to Chu et al;
U.S. Pat. No. 5,117,139 issued to Flom et al;
U.S. Pat. No. 4,939,120 issued to Moon et al;
U.S. Pat. No. 4,886,778 issued to Moon et al;

The patents identified above relate to superconducting rotating assemblies. In particular, the Chu et al patent describes a bearing assembly comprising a rotating member and at least one stationary member. A first magnet is mounted on the rotating member, and a second magnet is mounted on the stationary member. The superconductor is located such that it is stationary with respect to one magnet, but in motion relative to the other magnet. This can be accomplished by mounting the superconductor and the first magnet on the rotating member so that they are stationary with respect to each other, and mounting the second magnet alongside the rotating shaft so that the second magnet and the superconductor are in relative motion. The thrust and stability of the bearing system is increased by increasing the magnetic field of the second magnet.

The Flom et al patent is directed to a superconducting rotating assembly. The assembly comprises a rotating member having a magnet at each extremity, and a bearing made of material exhibiting superconducting properties. The bearing is formed as a recess in the superconducting material in the form of a cylindrical, closed-end orifice. The bearing exerts levitation forces on the magnets at each extremity of the rotating member. The levitation forces can be controlled by constructing the bearing from two different types of superconducting materials, or by heating the bearings.

The Moon et al '120 patent relates to a superconducting rotating assembly which includes a floating unsupported rotor. The assembly includes first and second bearings comprised of a material exhibiting superconducting properties. The rotor includes a magnetic pole at each extremity, with each pole resting in a bearing. A temperature bath is provided for maintaining the bearings at a predetermined temperature. Each magnet pole is thereby levitated and adapted to rotate in a non-contacting position by the field and pinning effects generated by the associated bearing.

The Moon et al '778 patent describes the same assembly as the Moon et al '120 patent except that the superconducting material in the Moon et al '778 patent does not totally enclose the circumference of the rotor. Although these patents relate to superconducting rotating assemblies, they do not describe such an assembly where the superconductor magnet interaction generates a restoring force as the shaft is transversely displaced, and where a gas jet is directed towards one end of the shaft to counteract unbalancing axial forces.

There have been recent attempts to develop passive superconducting bearings fabricated from HTSC materials. For example, Moon describes rotating assemblies employing superconducting bearings. For the present invention, a bearing system was developed that was used to rotate a magnetic rotor to a rotational speed of 450,000 rpm, with a peripheral velocity of 150 m/s. A fundamental limitation of these concepts is the lack of means to support the shaft while the superconductor is cooled below its $T_c$. Because of the hysteretic nature of Type II superconductors, a range of equilibrium positions for the shaft exists. A shaft that starts off in mechanical contact with a non-rotating member must therefore be lifted off by some other means be it manually or otherwise. This limits this type of bearing for use in laboratory demonstrations and basic research devices. As such, the bearing has little practical use.

There remains a need to provide a new superconducting bearing to remove this limitation. By employing a special configuration of permanent magnets and supplying the bearing with a small supply of gas, the shaft may stably and precisely positioned at all times.

SUMMARY OF THE INVENTION

The present invention includes a passive superconducting bearing system. The system has permanent magnets in the bore of the rotating member, stationary permanent magnets which encircle the shaft, stationary superconducting materials at the shaft ends, and a duct and pinhole outlet which directs a flow of gas towards one shaft end. The stationary permanent magnets interact with the permanent magnets in the shaft to radially position the shaft in the center of the stationary permanent magnets due to radial repulsive forces between poles of the same polarity. The stationary permanent magnets are positioned so as to axially load the shaft towards the end of the housing containing the pinhole outlet. A gas jet issuing from the pinhole outlet forms a hydrostatic gas bearing with the end of the shaft and counteracts the unbalancing axial force on the shaft caused by permanent magnet interaction. The superconductor-magnet interaction generates a restoring force as the shaft is transversely displaced in any direction away from its equilibrium position. The interaction does not assist shaft rotation, but adds to the stiffness and damping of the bearing system.

The present invention may also be described as a two step process for providing nonmechanical support to a rotating shaft. The first step of the process entails producing a radial force which floats the rotating shaft radially without mechanical support, as shown in the above-cited Moon et al patents. The second step of the process entails producing a first and a second axial force against the ends of the shaft along its axis without mechanical support or contact with the shaft. This is done by directing one axial adjustable streams of gas against the two ends (one stream of gas against each end) of the shaft, and by directing two axial magnetic fence against the ends of the shaft along the axis of the shaft to position the shaft as desired.

In the context of the present invention the term "axial" always means "along the axis of the shaft" while the term "radial" means around the circumference of the sides of the shaft.

The bearing of the present invention offers the following objects and advantages over other passive superconducting bearings. It precisely and non-mechanically positions the rotating shaft while the superconducting material passes from its normal to superconducting state, thereby "pinning" the magnetic flux such that the shaft is "cradled" in a very precise position. It can support steady loads, even when the superconductor exhibits, "flux creep" allows operation of the superconductor in the hysteretic Type II regime, where superconductor-magnet forces are highest provides load capacity and stiffness, even when the superconducting materials are at temperatures above their critical temperatures and are therefore not superconducting. It does not require precision machining of the superconducting material; and it allows the gap between the permanent magnets and the superconducting materials to be minimized, thereby increasing the stiffness, load capacity, and damping of the bearing.

These objects together with other objects, features and advantages of the invention will become more readily apparent from the following detailed description when taken in conjunction with the accompanying drawings wherein like elements are given like reference numerals throughout.

DESCRIPTION OF PREFERRED EMBODIMENTS

Figure 1:
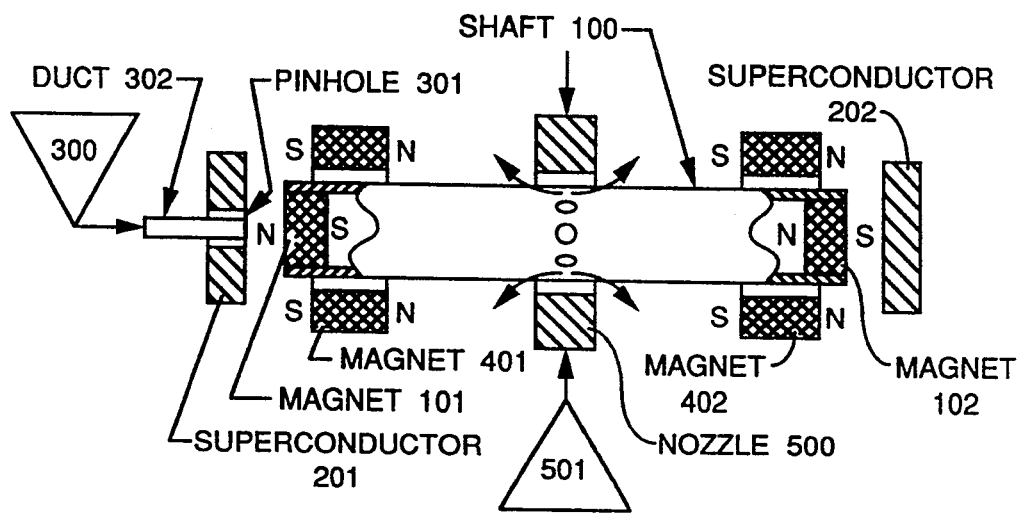
FIGS. 1 and 2 are illustrations of two embodiments of the present invention.

The present invention includes a passive superconducting bearing system and process in which a rotor which floats between magnetic fields is held in place by a stream of gas and by magnetic interaction of a superconducting magnet. The reader's attention is now directed towards FIG. 1, which is an illustration of an embodiment of the present invention that includes: a shaft 100 which houses two sets of permanent magnets 101 and 102 in its ends, two axial superconductor magnets 201 and 202, a supply of gas 300, a duct 302 and pinhole 301, and a central supply of gas 501 and a nozzle 500.

The shaft 100 may be a rotating member, and the bearing system includes: the permanent magnets 101 and 102 which are floated between the stationary radial permanent magnets 401 and 402 which are of an annular or toroidal shape that encircles the shaft; superconducting materials at the shaft ends in very close proximity to the shaft magnets; and a duct and pinhole outlet which direct a flow of gas towards one shaft end. The shaft may be rotated by electromechanical or aerodynamic means, such as the use of a turbine nozzle 500 which spins the shaft with a stream of gas or fluid from the adjustable supply 501. There are many examples of adjustable supplies of gas that can be used as the supply of gas 300 in FIG. 1. Usually the outputs are adjusted using a valve to vary the size of the output aperture.

When the superconductor materials are above their critical temperature and therefore not superconducting, the stationary permanent magnets interact with the permanent magnets in the shaft to radially position the shaft. With the magnet polarities as shown, the magnet configuration will center the shaft in the stationary permanent magnets due to radial repulsive forces between poles of the same polarity. The shaft 100 is stably supported along its radial axes.

The permanent magnet interaction also produces an unbalance axial force on the shaft so that the permanent magnet suspension is by itself unstable. In order to produce stability, a gas jet is directed towards one end of the shaft. The position of the stationary magnets can be chosen to produce a net magnetic force towards the gas jet. This net force is exactly balanced by the force of the gas jet on the shaft. Because the gas jet imparts a force on the shaft with an axial stiffness much greater than the "negative" (unstable) stiffness produced by the permanent magnet, the shaft is stably positioned without mechanical contact. In this suspended position, the shaft may rotate freely about its axial axis.

In FIG. 1, axial superconductor magnets 201 and 202 are placed at the ends of the axis of the shaft to help support the shaft axially by adjustable magnetic interaction with the permanent magnets 101 and 102 in the shaft. More specifically, the above-cited Moon et al patents show that radial ring magnets can be used to float and suspend a non-contacting superconductive rotating assembly. The present invention adds axial support to the shaft using an adjustable stream of gas supply 300 for the pinhole 301 and duct 302 and the axial superconductor magnets 201 and 202 to counter any axial force of the shaft and position it so that it floats freely without mechanical contact.

Figure 2:
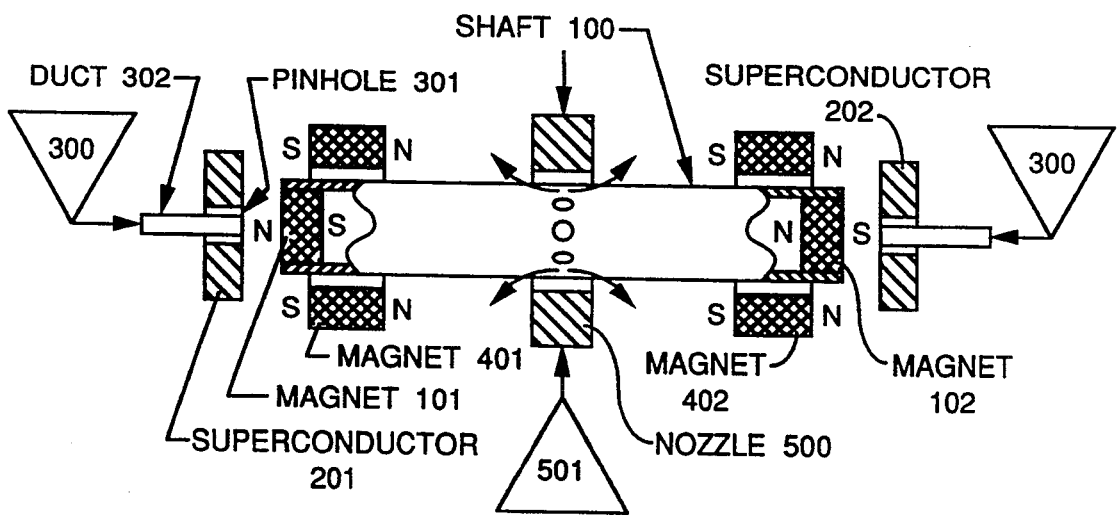

The axial force of the bearing system of FIG. 1 may be adjusted in two ways. First, by adjusting the pressure of the gas from the duct 302. Note that although only one axial duct and pinhole are shown in FIG. 1, FIG. 2 shows that a second duct, pinhole, and supply could be used in the second superconductor axial magnet 202. The elements of FIG. 2 can be operated as described above for FIG. 1. Similarly, one or more radial nozzles 500 could provide streams of gas that could be used in conjunction with the annular supporting magnets 401 and 402 for adjusted radial support.

The second method of adjusting the axial force on the shaft 100 is accomplished by adjusting the current that charges the superconductor magnets 201 and 202. The current can be reduced by a variable resistor or other methods known in the art. This has the direct effect of adjusting the magnetic fields produced by the superconductor magnets 201 and 202 so that the shaft is floated axially in the same way that the annular support magnets provides radial support.

If the superconductors are Type II materials, as they are cooled below their transition temperature, the magnetic flux produced by the permanent magnets that penetrate the superconductor is "pinned". Any change in position of the shaft will induce supercurrents in the superconductor which will tend to resist the change in position. As a result, the shaft will be "cradled" in the desired shaft position. The superconductor-magnet interaction generates a restoring force as the shaft is transversely displaced in any direction away from its equilibrium position. This interaction, however, offers little resistance to shaft rotation, due to the azimuthal symmetry of magnetic field produced by the permanent magnets. The rotational drag can thus be made quite small.

It might appear that the superconductors are not necessary since the permanent magnets and gas jet alone are sufficient for positioning the shaft. In fact, the superconductors greatly add to the stiffness and damping of the bearing system. Without the superconductors, the bearing would have insufficient stiffness and damping for high speed rotation of the shaft.

Flux creep, or a decay of supercurrent amplitude with time, has been experimentally observed in high temperature superconductors. If a magnet that is "pinned" in a certain position is subsequently displaced, the restoring force generated by the induced currents will initially be high, and then will decay with time. By incorporating the stationary permanent magnets into the bearing system, the bearing will support steady loads even with superconductor flux creep.

The invention is especially suited for superconductors operating in the Type II regime, where flux penetration and flux pinning effects are important, and the force-displacement characteristics are highly hysteretic. The invention will also work for superconductors operating in the Type I regime, for which the flux is totally excluded from the interior of the superconductor (the Meissner effect). However, the Type I regime is very limited in terms of bearing load capacity and stiffness, and therefore most practical systems will operate in the Type II regime.

Because the interaction between a superconductor and a permanent magnet is maximized at close spacings, the invention offers the advantage of precisely positioning the shaft in close proximity of the superconductor. As a result of the small gap spacing between the superconductor and the face of the permanent magnets in the shaft, the stiffness, damping, and load capacity of the bearing are maximized.

The invention also offers certain fabrication advantages over other passive superconducting bearings. The superconductor need not be specially contoured or machined. The face of the superconductor need only be ground flat.

The invention is well suited for use in cryogenic turbomachines, such as turbo expanders and cryogenic compressors. Because the bearings operate at cryogenic temperatures, the inefficiency resulting from heat leak from the bearings to the process gas is either eliminated or substantially reduced. During cool down of the turbomachine, when the bearing temperatures are still above the critical temperature of the superconductor, positioning and support of the shaft are achieved by the permanent magnets and the gas jet directed at the end of the shaft. After cool down, the full stiffness, load capacity, and damping of the bearing can be attained. The invention can also be used as bearings for room temperature applications by maintaining the bearing compartments of the machine below the critical temperature for the superconducting material.

While the invention has been described in its presently preferred embodiment it is understood that the words which have been used are words of description rather than words of limitation and that changes within the purview of the appended claims may be made without departing from the scope and spirit of the invention in its broader aspects.

We claim:

1. A bearing system, for providing nonmechanical support to a rotating shaft, said bearing system comprising:

a means for producing a radial force which floats said rotating shaft radially without mechanical support; and a means for adjustably generating axial force to center said rotating shaft above said producing means without mechanical support, wherein said shaft has a first and second end which respectively houses first and second axial permanent magnets which respectively force the first and second permanent shaft magnets to float said shaft therebetween, wherein said generating means further comprises: a supply of an axial stream of gas which outputs said axial stream of gas with an adjustable pressure; and indent a means for directing said axial stream of gas against said first end of said shaft to provide thereby an axial force, said axial force being adjusted as said adjustable pressure is adjusted so that said axial force pushes said shaft so that it is centered over said producing means.

2. A bearing system, as defined in claim 1, and wherein said producing means comprises:

first and second radial permanent magnets which respectively surround the first and second axial permanent shaft magnets to float said shaft therebetween; and a means for adjustably directing said axial stream of gas against the ends of the shaft to adjust the an axial position of the shaft between the first and second radial permanent magnets.

3. A bearing system, as defined in claim 1, wherein said generating means further comprises:

a supply of an other axial stream of gas which outputs said other axial stream of gas with another adjustable pressure; and a means for directing said other axial stream of gas to said second end of said shaft to provide thereby another axial force, said an other axial force being adjusted as said an other adjustable pressure is adjusted so that said an other axial force pushes said shaft so that it is centered over said producing means.

4. A bearing system, for providing nonmechanical support to a rotating shaft, said bearing system comprising:

a means for producing a radial force which floats said rotating shaft radially without mechanical support; and a means for adjustably generating axial force to center said rotating shaft above said producing means without mechanical support wherein said shaft has a first and second end which respectively houses first and second permanent shaft magnets, and wherein said generating means comprises first and second axial permanent magnets which respectively force the first and second permanent shaft magnets to float said shaft therebetween wherein said first and second axial magnets of said generating means further respectively comprises first and second axial superconductors which have a critical temperature $T_c$ and which are operated at temperatures below the critical temperature $T_c$ to provide stiffness and damping as superconducting magnets, and a means for adjustably directing a stream of gas against the ends of said shaft to adjust an axial position of said shaft.

5. A process for providing nonmechanical support to a rotating shaft, said process comprising the steps of:

producing a radial force which floats said rotating shaft radially without mechanical support; and adjustably generating axial force to center said rotating shaft without mechanical support, wherein said shaft has a first and second end which respectively houses first and second permanent shaft magnets, and wherein said generating step comprises using first and second axial permanent magnets which respectively force the first and second permanent shaft magnets to float said shaft therebetween, wherein said generating step further comprises using a supply of an axial stream of gas which outputs said axial stream of gas with an adjustable pressure; and directing said axial stream of gas at said first end of said shaft to provide thereby an axial force, said axial force being adjusted as said adjustable pressure is adjusted so that said axial force pushes said shaft so that it is positioned.

6. A process, as defined in claim 5, wherein said producing step comprises:

using first and second radial permanent magnets which respectively surround the first and second permanent shaft magnets to float said shaft therebetween; and adjustably directing an axial stream of gas against the shafts sides to adjust the shafts horizontal position between the first and second radial permanents magnets.

7. A process, as defined in claim 5 wherein said generating step further comprises the substeps of:

supplying a second axial stream of gas with a second adjustable pressure; and a means for directing said second axial stream of gas said second end of said shaft to provide thereby a second axial force, said second axial force being adjusted as said second adjustable pressure is adjusted so that said second axial force pushes said shaft so that it is centered.

8. A bearing process for providing nonmechanical support to a rotating shaft, said bearing process comprising the steps of:

producing a radial force which floats said rotating shaft radially without mechanical support; and adjustably generating axial force to center said rotating shaft above said producing means without mechanical support, wherein said shaft has a first and second end which respectively houses first and second permanent shaft magnets, and wherein said generating step comprises using first and second axial permanent magnets which respectively force the first and second permanent shaft magnets to float said shaft therebetween, wherein said generating step further comprises using a use of first and second axial superconductor respectively as said first and second axial permanent magnets which each have a critical temperature $T_c$, and which are operated at temperatures below the critical temperature $T_c$ to provide stiffness and damping as superconducting magnets, and a means for adjustably directing a stream of gas against the ends of said shaft to adjust an axial position of said shaft.

* * * * *